US 9,970,447 B2

(12) United States Patent
Oda et al.

(10) Patent No.: US 9,970,447 B2
(45) Date of Patent: May 15, 2018

(54) FUEL CELL SYSTEM AND METHOD FOR CONTROLLING ROTATIONAL SPEED OF AIR COMPRESSOR

(71) Applicant: TOYOTA JIDOSHA KABUSHIKI KAISHA, Toyota-shi, Aichi-ken (JP)

(72) Inventors: Kohei Oda, Toyota (JP); Kenji Umayahara, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 378 days.

(21) Appl. No.: 14/934,711

(22) Filed: Nov. 6, 2015

(65) Prior Publication Data

US 2016/0138600 A1    May 19, 2016

(30) Foreign Application Priority Data

Nov. 14, 2014   (JP) ................. 2014-231880

(51) Int. Cl.
*F04D 27/02*     (2006.01)
*B60L 1/00*      (2006.01)
(Continued)

(52) U.S. Cl.
CPC .......... *F04D 27/0261* (2013.01); *B60L 1/003* (2013.01); *B60L 11/1883* (2013.01);
(Continued)

(58) Field of Classification Search
CPC .. F04D 27/0261; B60L 1/003; B60L 11/1883; H01M 8/04694; H01M 8/04753;
(Continued)

(56) References Cited

U.S. PATENT DOCUMENTS 5,550,445 A    8/1996 Nii
8,174,222 B2*  5/2012 Patel ................. B60K 1/02
                                        318/400.01
(Continued)

FOREIGN PATENT DOCUMENTS

CA    2 907 812 A1    9/2014
JP    H07-095703 A    4/1995
(Continued)

*Primary Examiner* — Ninh H Nguyen
*Assistant Examiner* — Topaz L Elliott
(74) *Attorney, Agent, or Firm* — Finnegan, Henderson, Farabow, Garrett & Dunner, LLP (57) ABSTRACT

A fuel cell system includes an air compressor that supplies oxidant gas to a fuel cell installed in a fuel cell vehicle, a measured rotational speed acquirer that acquires a measured value of rotational speed of the air compressor, and a controller that calculates a rotational speed command value of the air compressor based on required generated power of the fuel cell, calculates a torque command value of the air compressor based on the calculated rotational speed command value and current rotational speed of the air compressor, and controls rotational speed of the air compressor based on the calculated torque command value. The controller estimates the current rotational speed of the air compressor baaed on the measured value of the rotational speed acquired by the measured rotational speed acquirer and a history of the calculated torque command value, and calculates the torque command value by using the estimated rotational speed.

10 Claims, 3 Drawing Sheets

(51) Int. Cl.
  *B60L 11/18* (2006.01)
  *H01M 8/04694* (2016.01)
  *H01M 8/04746* (2016.01)

(52) U.S. Cl.
  CPC ... *H01M 8/04694* (2013.01); *H01M 8/04753* (2013.01); *F05D 2260/821* (2013.01); *F05D 2270/03* (2013.01); *F05D 2270/304* (2013.01); *F05D 2270/335* (2013.01); *F05D 2270/44* (2013.01); *H01M 2250/20* (2013.01); *Y02T 90/32* (2013.01); *Y02T 90/34* (2013.01)

(58) Field of Classification Search
  CPC .... H01M 2250/20; Y02T 90/34; Y02T 90/32; F05D 2260/821; F05D 2270/02; F05D 2270/021; F05D 2270/03; F05D 2270/44; F05D 2270/304; F05D 2270/335
  See application file for complete search history.

(56) References Cited

U.S. PATENT DOCUMENTS

| | | | |
|---|---|---|---|
| 8,594,874 B2 * | 11/2013 | Katano | B60L 11/1881 180/65.31 |
| 2013/0298881 A1 * | 11/2013 | Ai | F02B 39/04 123/565 |
| 2014/0277883 A1 * | 9/2014 | Pulliam | B60L 15/20 701/22 |
| 2015/0030464 A1 * | 1/2015 | Lemaitre | F02C 9/00 417/47 |

FOREIGN PATENT DOCUMENTS

| | | |
|---|---|---|
| JP | H11278083 A | 10/1999 |
| JP | 2003-168467 A | 6/2003 |
| JP | 2011-211770 | 10/2011 |
| JP | 2011-229326 A | 11/2011 |

* cited by examiner

FUEL CELL SYSTEM AND METHOD FOR CONTROLLING ROTATIONAL SPEED OF AIR COMPRESSOR

CROSS-REFERENCE TO RELATED APPLICATION

This application claims priority to Japanese Patent Application No. 2014-231880 filed on Nov. 14, 2014, the entire contents of which are incorporated herein by reference.

BACKGROUND

1. Field of the Invention

The present invention relates to a fuel cell system and to a method for controlling rotational speed of an air compressor.

2. Description of Related Art

In conventional fuel cell systems, rotational speed of an air compressor is controlled by adjusting a torque command value provided to the air compressor in accordance with power required to be generated by a fuel cell. In JP2011-211770A, the torque command value is obtained by using a measured value of the rotational speed obtained from an output signal from a sensor provided to a driving motor or the air compressor.

However, with the conventional technique, for example, the following problem might occur when the measured value of the rotational speed is transmitted among a plurality of ECUs. Specifically, when the reception of the measured value delays, the received measured value is different from an actual value of the current rotational speed. Thus, overshoot of the rotational speed of the air compressor from target rotational speed occurs.

SUMMARY

The present invention is made to solve at least part of the problem described above, and can be implemented as the following aspects.

(1) One aspect of the present invention provides a fuel cell system installed in a fuel cell vehicle. The fuel cell system may include an air compressor that supplies oxidant gas to a fuel cell installed in the fuel cell vehicle, a measured rotational speed acquirer that acquires a measured value of rotational speed of the air compressor, and a controller that calculates a rotational speed command value of the air compressor based on required generated power of the fuel cell, calculates a torque command value of the air compressor based on the calculated rotational speed command value and current rotational speed of the air compressor, and controls rotational speed of the air compressor based on the calculated torque command value. The controller may estimate the current rotational speed of the air compressor based on the measured value of the rotational speed acquired by the measured rotational speed acquirer and a history of the calculated torque command value, and calculate the torque command value by using the estimated rotational speed. In the fuel cell system having the configuration, instead of directly using the current rotational speed of the air compressor (including time delay), the torque command value is obtained by using the current rotational speed of the air compressor estimated based on the past history of the torque command value. Thus, the influence of the delay of the measured value on the rotational speed can be reduced. As a result, overshoot of the rotational speed of the air compressor from a target rotational speed can be reduced.

(2) In the fuel cell system according to the above-described aspect, the controller may perform filtering on the measured value of the rotational speed acquired by the measured rotational speed acquirer, estimate the current rotational speed based on rotational speed as a result of the filtering and the history of the calculated torque command value, and calculate the torque command value by using the estimated rotational speed. In the fuel cell system, the overshoot caused by the delay in the measured value of the rotational speed due to the filtering can be reduced, while obtaining the advantageous effect of the filtering.

(3) In the fuel cell system according to the above-described aspect, the controller may include a first computer that calculates the torque command value, and a second computer that controls rotational speed of the air compressor based on the torque command value. The second computer may transmit the rotational speed acquired by the measured rotational speed acquirer to the first computer. In the fuel cell system, the overshoot can be reduced when the reception of the measured value of the rotational speed delays due to communication delay between the first computer and the second computer.

(4) In the fuel cell system according to the above-described aspect, the controller may perform smoothing processing on the calculated torque command value to generate an actual torque command value, and control the rotational speed by using the actual torque command value, and the controller may estimate the actual torque command value corresponding to each value in the history of the calculated torque command value, and estimate the current rotational speed based on each the estimated actual torque command value and the measured value of the rotational speed. In the fuel cell system, highly accurate rotational speed control can be performed on the air compressor.

(5) In the fuel cell system according to the above-described aspect, the history of the calculated torque command value may include a plurality of newest torque command values obtained by the calculation. In the fuel cell system, the current rotational speed can be more accurately estimated.

(6) Another aspect of the present invention provides a method for controlling rotational speed of an air compressor in a fuel cell system including an air compressor that supplies oxidant gas to a fuel cell installed in a fuel cell vehicle. The method for controlling rotational speed of the air compressor may include a acquiring a measured value of rotational speed of the air compressor, and a calculating a rotational speed command value of the air compressor based on required generated power of the fuel cell; calculating a torque command value of the air compressor based on the calculated rotational speed command value and current rotational speed of the air compressor, and controlling the rotational speed of the air compressor based on the calculated torque command value. The controlling the rotational speed of the air compressor may estimate the current rotational speed of the air compressor based on the measured, value acquired in the acquiring the measured value of the rotational speed and a history of the calculated torque command value, and calculate the torque command value by using the estimated rotational speed. In the method for controlling rotational speed of an air compressor having the configuration, the overshoot of the rotational speed of the air compressor from the target rotational speed can be reduced, as in the fuel cell system of the above described aspect.

The present invention may also be implemented in various embodiments other than the fuel cell system, or the method for controlling rotational speed of an air compressor. For example, the present invention may be implemented as a vehicle including a fuel cell system, a computer program for implementing steps in the method for controlling rotational speed of an air compressor, and a recording medium in which the computer program is recorded.

Next, an embodiment of the present invention is Described.

DESCRIPTION OF THE PREFERRED EMBODIMENTS

A. Hardware Configuration

Figure 1:
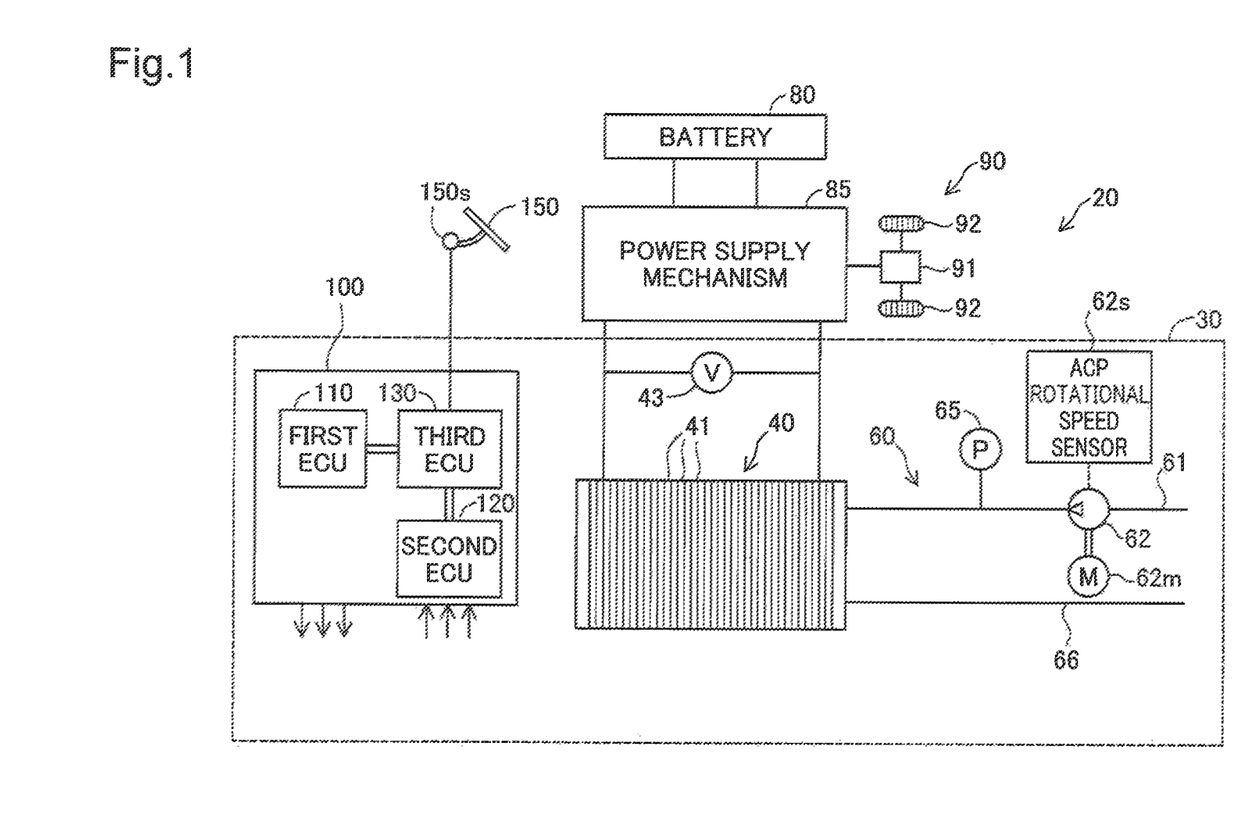
FIG. 1 is a diagram illustrating a schematic configuration of a fuel cell vehicle as one embodiment of the present invention.

FIG. 1 is a diagram illustrating a schematic configuration of a fuel cell vehicle 20 as one embodiment of the present invention. The fuel cell vehicle 20 is a four-wheel-drive vehicle and includes a fuel cell system 30, a battery 80, a power supply mechanism 85, and a drive mechanism 90.

The fuel cell system 30 includes a fuel cell stack 40, an air supply and exhaust mechanism 60, and a control unit 100. The fuel cell system 30 includes, as flow paths other than the air supply and exhaust mechanism 60, a hydrogen gas supply and exhaust mechanism and a cooling water circulation mechanism that are not directly related to the present invention and thus will not be described.

The fuel cell stack 40 generates power through an electrochemical reaction between hydrogen and oxygen, and is formed by stacking a plurality of unit cells 41. Each of the unit cells 41 includes an anode, a cathode, an electrolyte, a separator, and the like. In the present embodiment, the fuel cell stack 40, which may be of various types, is a solid polymer fuel cell.

The air supply and exhaust mechanism 60 supplies and discharges air, as oxidant gas, to and from the fuel cell stack 40. The air supply and exhaust mechanism 60 includes an air supply path 61 and an air discharge path 66. The air supply path 61 and the air discharge path 66 are flow paths through which atmosphere openings of the air supply path 61 and the air discharge path 66 are connected to the fuel cell stack 40. An air cleaner is disposed at the atmosphere opening of the air supply path 61.

The air supply and exhaust mechanism 60 includes an air compressor 62 that is disposed at an intermediate portion of the air supply path 61. The air compressor 62 takes in air from the atmosphere opening side of the air supply path 61 and compresses the air. The air compressor 62 includes an air compressor motor 62m for driving the air compressor 62, and an air compressor rotational speed sensor 62s that detects rotational speed of the air compressor 62.

The air supply and exhaust mechanism 60 includes a pressure sensor 65 as a pressure detector. The pressure sensor 65 detects air pressure in the air supply path 61.

The power supply mechanism 85 is connected to the fuel cell stack 40 and supplies power that is generated by the fuel cell stack 40 to electrically powered equipment. Examples of the electrically powered equipment, include a motor 91 that drives driving wheels 32 in the drive mechanism 90, a compressor (not illustrated) for air conditioning, and the like. The power supply mechanism 85 transmits and receives power not only to and from the fuel cell system 30 but also to and from the battery 80. In the present embodiment where the fuel cell stack 40 serves as a main driving source of the fuel cell vehicle 20, the battery 80 is used as a power source that drives the fuel cell vehicle 20 during a period in which the power generation amount of the fuel cell stack 40 is small such as a period immediately after the fuel cell vehicle 20 is started. The battery 80 is a secondary battery that can charge and discharge power, and is formed of a nickel hydrogen battery and the like for example.

The control unit 100 controls an operation of the fuel cell system 30. The control unit 100 controls various operations, such as an operation of the air compressor 62, by receiving various signals. Examples of the signals include output signals from a voltage sensor 43 that detects power generation voltage of the fuel cell stack 40, an accelerator position sensor 150s that detects the amount of operation on an accelerator pedal 150 of the fuel cell vehicle 20 (hereinafter, referred to as "accelerator position"), and the like. The accelerator pedal 150 is operated by a driver.

More specifically, the control unit 100 includes first, second, and third electronic control units (ECUs) 110, 120, and 130. The ECUs 110, 120, and 130 are each a microcomputer incorporating a central processing unit (CPU), a random access memory (RAM), and a read only memory (ROM). The first ECU 110 controls the fuel cell system 30. The second ECU 120 controls the air compressor 62. The third ECU 130 is connected to and can bi-directionally communicate with the first ECU 110 and the second ECU 120, and performs overall control of a power train of the vehicle. More specifically, the third ECU 130 sets driving torque of the vehicle in accordance with the accelerator position detected by the accelerator position sensor 150s, and performs control so that the set driving torque is achieved. The first ECU 110, the second ECU 120, and the third ECU 130 cooperate to execute processing to control the rotational speed of the air compressor 62.

In the present embodiment; the control unit 100 includes the three ECUs 110, 120, and 130. Alternatively, the three ECUs 110, 120, and 130 may be formed as a single ECU. Furthermore, the second ECU 120 and the third ECU 130 may be formed as a single ECU, or the first ECU 110 and the third ECU 130 may be formed as a single ECU.

B. Rotational Speed Control for Air Compressor

Figure 2:
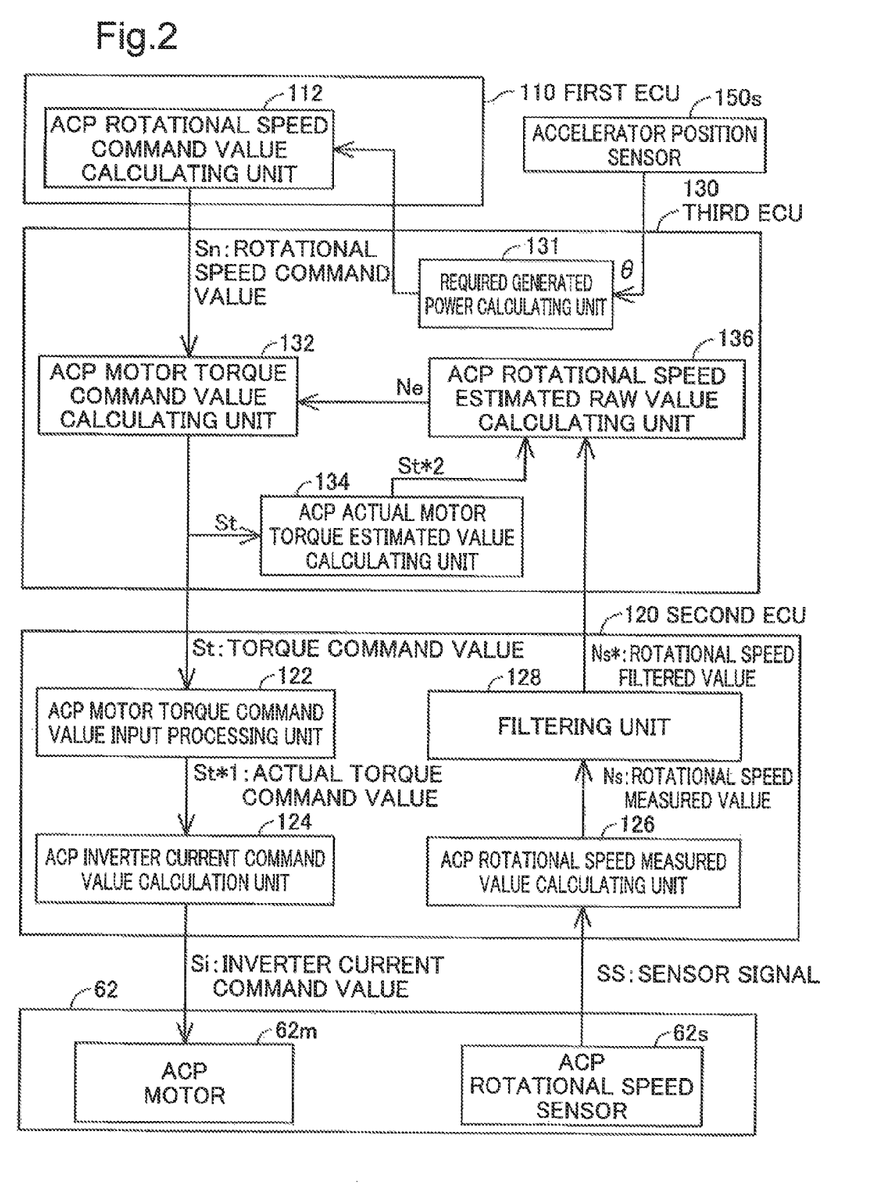
FIG. 2 is a control block diagram illustrating rotational speed control for an air compressor.

FIG. 2 is a control block diagram illustrating rotational speed control for the air compressor 62. As illustrated in the figure, an accelerator position θ, detected by the accelerator position sensor 150s, is transmitted to the third ECU 130.

The third ECU 130 includes a required generated power calculating unit 131 as a functional component. The required generated power calculating unit 131 calculates required generated power of the fuel cell stack 40 based on the accelerator position θ. The required generated power may be calculated by taking auxiliary machines of the fuel cell vehicle 20 and consumed power of an air conditioning device into consideration, and by taking power that can be obtained from the battery 80 into consideration. The calculated required generated power is transmitted to the first ECU 110. The accelerator position θ may be directly transmitted to the first ECU 110, and the required generated power may be calculated on the first ECU 110 side.

The first ECU 110 includes an air compressor (hereinafter, referred to as "ACP" as appropriate) rotational speed command value calculating unit 112 as a functional component. First of all, the ACP rotational speed command value calculating unit 112 acquires required generated power transmitted from the third ECU 130, and calculates a flow rate of air to be supplied to the fuel cell stack 40 to cause the fuel cell stack 40 to output the required generated power. Then, the ACP rotational speed command value calculating unit 112 calculates a rotational speed command value Sn of the air compressor 62 required for supplying the air at the calculated flow rate.

The ACP rotational speed command, value calculating unit 112 performs the various calculations by referring to a map prepared in advance in the ROM and through calculations and the like. Then, the first ECU 110 transmits the rotational speed command value Sn, calculated by the ACP rotational speed command value calculating unit 112, to the third ECU 130.

The third ECU 130 includes (i) an ACP motor torque command value calculating unit 132 (hereinafter, referred to as "AMT command value calculating unit 132"), (ii) an ACP actual motor torque estimated value calculating unit 134 (hereinafter, referred to as "AAMT estimated, value calculating unit 134"), and (iii) an ACP rotational speed estimated raw value calculating unit 136 (hereinafter, referred to as "ARS estimated raw value calculating unit 136"), as functional components. The AMT command value calculating unit 132 acquires the rotational speed command value Sn transmitted from the first ECU 110, and acquires rotational speed estimated raw value Ne from the ARS estimated raw value calculating unit 136. The rotational speed estimated raw value Ne indicates a value (i.e., raw value or current value) of current rotational speed of the air compressor 62, and is an estimated value obtained by the ARS estimated raw value calculating unit 136. The AAMT estimated value calculating unit 134 and the ARS estimated raw value calculating unit 136 cooperate to execute processing of estimating the raw value of the current rotational speed. The operation of the AAMT estimated value calculating unit 134 and the ARS estimated raw value calculating unit 136 is described later.

Then, the AMT command value calculating unit 132 calculates a torque command value St to the air compressor 62 by using the rotational speed command value Sn and the rotational speed estimated raw value Ne of the air compressor 62 that have been acquired. The torque command value St of a positive value is used for increasing the rotational speed of the air compressor 62, and the torque command value St of a negative value or a value 0 is used for reducing the rotational speed of the air compressor 62. This calculation is performed by referring to the map prepared in the ROM in advance or the like. Then, the third ECU 130 transmits the torque command value St, calculated by the AMT command value calculating unit 132, to the second ECU 120.

The second ECU 120 includes (i) an ACP motor torque command value input processing unit 122 (hereinafter, referred to as "AMT command value input processing unit 122"), (ii) an ACP inverter current command value calculation unit 124 (hereinafter, referred to as "AIC command value calculation unit 124"), (iii) an ACP rotational speed measured value calculating unit 126 (hereinafter, referred to as "ARS measured value calculating unit 126"), and (iv) a filtering unit 128, as functional components. The AMT command value input processing unit 122 acquires the torque command value St transmitted from the third ECU 130. Then, the AMT command value input processing unit 122 executes smoothing processing on the acquired torque command value St. The smoothing processing is known processing of smoothing the current torque command value St with the torque command values within a predetermined time period in the past. The torque command value St after the smoothing processing is transmitted to the AIC command value calculation unit 124 as an actual torque command value St*1.

The command value calculation unit 124 obtains an inverter current command value Si as a command to an inverter connected to the air compressor motor 62$m$, based on the actual torque command value St*1 transmitted from the AMT command value input processing unit 122. Then, the AIC command value calculation unit 124 outputs the calculated inverter current command value Si to an inverter of the air compressor motor 62$m$.

As described above, in the present embodiment, the estimated raw value of the current rotational speed of the air compressor 62 is used as the rotational speed estimated raw value Ne required for the calculation by the AMT command value calculating unit 132 of the third ECU 130. The estimated value is used instead of directly using the measured value obtained from the sensor signal from the air compressor rotational speed sensor 62$s$, for the following two reasons.

The measured value includes noise and the like, and thus it is a common practice to perform filtering for removing the noise. As a result, the measured value delays from the raw value of the current rotational speed. Furthermore, communication delay between the third ECU 130 and the second ECU 120 occurs. All things considered, the estimated value is used instead of directly using the measured value obtained from the sensor signal from the air compressor rotational speed sensor 62$s$ to prevent a problem caused by these delays.

The estimated raw value of the current rotational speed of the air compressor 62 is obtained as follows. First of all, the second ECU 120 receives a sensor signal SS from the air compressor rotational speed sensor 62$s$.

The ARS measured value calculating unit 126 of the second ECU 120 calculates the measured value Ns of the rotational speed of the ACP air compressor 62, based on the sensor signal SS from the air compressor rotational speed sensor 62$s$.

The filtering unit 128 performs the filtering, to remove the noise, on a rotational speed measured value Ns calculated by the ARS measured value calculating unit 126. The filtering does not necessarily be the smoothing processing (blunting processing) employed in the configuration described above. Processing other than the smoothing processing can be executed as long as high frequency components at or higher than a predetermined frequency, in a graph of the rotational speed measured value with horizontal and vertical axes respectively representing the time and the rotational speed measured value, can be removed. The rotational speed measured value Ns as a result of the filtering is transmitted to the third ECU 130 as a rotational speed filtered value Ns*.

The AAMT estimated value calculating unit 134 of the third ECU 130 executes processing of calculating an actual torque estimated value St*2 from the torque command value St calculated by the AMT command value calculating unit 132. This processing is executed to obtain the actual, torque command value St*1 (or its approximate value) for actually providing torque to the air compressor 62 in the third ECU 130, and is the same as the smoothing processing executed by the AMT command value input processing unit 122. A value as a result of the smoothing processing is temporarily stored in the RAM as the actual torque estimated value St*2.

More specifically, the actual torque estimated value St*2 is obtained, each time the AAMT estimated value calculating unit 134 performs the calculation. A plurality (three in the present embodiment) of the latest actual torque estimated, values St*2 are stored, in the RAM, and are transmitted to the ARS estimated raw value calculating unit 136. The number of stored actual torque estimated values St*2 may be different from three and may be two, four, five, or the like.

The ARS estimated raw value calculating unit 136 obtains the rotational speed estimated raw value Ne, as the estimated raw value of the current rotational speed of the air compressor 62, from the plurality of actual torque estimated values St*2 and a rotational speed filtered value Ns* transmitted from the second ECU 120.

The torque and the rotational speed (at a rotational speed per unit time, rotational rate) of the air compressor motor 62m are associated with each other as in the case of a general motor. Thus, when the raw value of the current rotational speed of the air compressor 62 and the torque actually applied to the air compressor motor 62m are recognized, the rotational speed obtained by the torque can be recognized. Accordingly, the ARS estimated raw value calculating unit 136 acquires, from the AAMT estimated value calculating unit 134, a plurality of the latest, estimated values of the actual torque command value as the actual torque estimated values St*2. Then, the ARS estimated raw value calculating unit 136 uses a change rate of the rotational speed based on the actual torque estimated values St*2 to process the rotational speed filtered value Ns* transmitted from the second ECU 120. Thus, the rotational speed estimated raw value Ne is obtained as the estimated current rotational speed of the air compressor 62 on which the change in the rotational speed during the delayed period is reflected.

As described above, the first ECU 110, the second ECU 120, and the third ECU 130 cooperate to control the rotational speed of the air compressor 62. As a result, the output power from the fuel cell stack 40 can be appropriately adjusted to a level corresponding to the required generated power,

C. Effect of Embodiment

Figure 3:
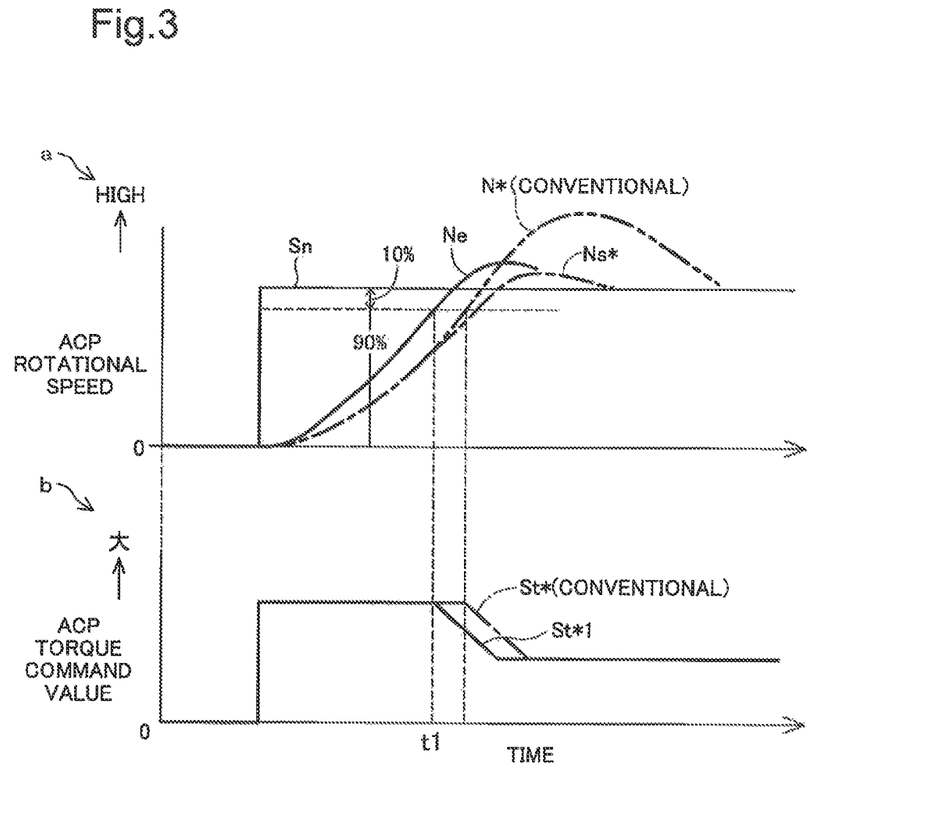
FIG. 3 is a timing chart illustrating how rotational speed and a torque command value of the air compressor change over time in the embodiment.

FIG. 3 is a timing chart illustrating now the rotational speed and the torque command value of the air compressor 62 achieved by the present embodiment change over time. Graphs a and b in the figure respectively illustrate the rotational speed and the torque command value.

In the graph a in FIG. 3, a dotted chain line represents the rotational speed filtered value Ns* obtained by the filtering unit 128 of the second ECU 120, a bold line represents the rotational speed estimated raw value Ne obtained by the ARS estimated raw value calculating unit 136, and a thin line represents the rotational speed command value Sn obtained by the first ECU 110.

A large overshoot of the actual rotational speed N* of the conventional technique, represented by a two dot chain line, from the rotational speed command value Sn as the target rotational speed occurs. In the present embodiment, the AMT command value calculating unit 132 uses the rotational speed estimated raw value Ne calculated by the ARS estimated raw value calculating unit 136 to obtain the torque command value. Thus, at a time point t1, where the rotational speed estimated raw value Ne illustrated in the graph a in FIG. 3 reaches the predetermined percentage (90% herein) of the rotational speed command value Sn, the actual torque command value St*1 starts to fall due to feedback control (the graph b in FIG. 3). Thus, the rotational speed estimated raw value Ne starts to rise earlier than the rotational speed N* only based on the measured value, whereby the timing of the torque command to the air compressor 62 is improved compared with the conventional technique. As a result, the overshoot amount of the rotational speed filtered value Ns* is reduced compared with the conventional technique as illustrated in the graph a in FIG. 3.

As described above in detail, the fuel cell system 30 according to the present embodiment can reduce the overshoot of the rotational speed of the air compressor 62 from the target rotational speed. As a result, the output power from the fuel cell stack 40 can be appropriately adjusted to a level corresponding to the required generated power of the fuel cell stack 40.

D. Modifications

Modification 1

In the embodiment, the reception of the measured value of the rotational speed of the air compressor 62 delays because of the two reasons, that is, because of the filtering and the communication delay between the third. ECU 130 and the second ECU 120. The present invention may be applied to a system in which the reception of the measured value of the rotational speed of the air compressor 62 delays because of any cue of the two reasons. The present invention may be further applied to a system having any configuration in which the reception of the measured value of the rotational speed of the air compressor delays due to a reason other than the two reasons described above, Modification 2:

In the embodiment, the AMT command value input processing unit 122 of the second ECU 120 executes the smoothing processing on the torque command value St obtained by the third ECU 130, and the actual torque is calculated by the AIC command value calculation unit 124 based on the actual torque command value St*1 as a result of the smoothing processing. Alternatively, the actual torque may be calculated, by using the torque command value St obtained by the third ECU 130 without executing the smoothing processing by the AMT command value input processing unit 122. Here, in the third ECU 130, a plurality of (three, for example) the latest torque command values St obtained by the AMT command value calculating unit 132 may be transmitted to the ARS estimated raw value calculating unit 136 as a torque command value history, without executing processing of the AAMT estimated value calculating unit 134. The torque command value history is not limited to the three latest torque command values, and may be nth (integer equal to or larger than 0) to mth (integer equal to or larger than 1) torque command values from the latest torque command value.

Modification 3:

In the embodiment, the required generated power of the fuel cell stack 40 is calculated based on the accelerator position θ in the third ECU 130. However, how the required generated, power is calculated is not limited to this. For example, the required generated power of an automatic driving vehicle may be calculated not based on the accelerator position θ but based on a driving state of the vehicle.

Part of the functions implemented by software in the embodiment may be implemented by hardware (for example, an integrated circuit), while part of the functions implemented by hardware in the embodiment may be implemented by software.

The present invention is not limited to the embodiment and modifications and can be implemented, in various forms without departing from the gist of the present invention. For example, the technical features in the embodiment and modifications corresponding to the technical features in the aspects described in the summary may be replaced or combined as appropriate in order to solve part or the whole of the problem described above or achieve part or the whole of the effects described above. Furthermore, the components in the embodiment and modifications other than the components in the independent claims are optional and can be omitted as appropriate.

What is claimed is:

1. A fuel cell system installed in a fuel cell vehicle, the fuel cell system comprising:
   an air compressor that supplies oxidant gas to a fuel cell installed in the fuel cell vehicle;
   a measured rotational speed acquirer that acquires a measured value of rotational speed of the air compressor; and
   a controller that calculates a rotational speed command value of the air compressor based on required generated power of the fuel cell, calculates a torque command value of the air compressor based on the calculated rotational speed command value and current rotational speed of the air compressor, and controls rotational speed of the air compressor based ort the calculated torque command, value, wherein
   the controller estimates the current rotational speed of the air compressor based on the measured value of the rotational speed acquired by the measured rotational speed acquirer and a history of the calculated torque command value, and calculates the torque command value by using the estimated rotational speed.

2. The fuel cell system in accordance with claim 1, wherein
   the controller performs filtering on the measured value of the rotational speed acquired by the measured rotational speed acquirer, estimates the current rotational speed based on rotational speed as a result of the filtering and the history of the calculated torque command value, and calculates the torque command value by using the estimated rotational speed.

3. The fuel cell system in accordance with claim 1, wherein
   the controller includes:
      a first computer that calculates the torque command value; and
      a second computer that controls rotational speed of the air compressor based on the torque command value, and
   the second computer transmits the rotational speed acquired by the measured rotational speed acquirer to the first computer.

4. The fuel cell system in accordance with claim 1, wherein
   the controller performs smoothing processing on the calculated torque command value to generate an actual torque command value, and controls the rotational speed by using the actual torque command value, and
   the controller estimates the actual torque command value corresponding to each value in the history of the calculated torque command value, and estimates the current rotational speed based on each estimated actual torque command value and the measured value of the rotational speed.

5. The fuel cell system in accordance with claim 1, wherein the history of the calculated torque command value includes a plurality of newest torque command values obtained by the calculation.

6. A method for controlling rotational speed of an air compressor in a fuel cell system including an air compressor that supplies oxidant gas to a fuel cell installed in a fuel cell vehicle, the method comprising:
   acquiring a measured value of rotational speed of the air compressor; and
   calculating a rotational speed command value of the air compressor based on required generated power of the fuel cell, calculating a torque command value of the air compressor based on the calculated rotational speed command value and current rotational speed of the air compressor, and controlling the rotational speed of the air compressor based on the calculated torque command value, wherein
   the controlling the rotational speed of the air compressor includes:
      estimating the current rotational speed of the air compressor based on the measured value acquired in the acquiring the measured value of the rotational speed and a history of the calculated torque command value; and
      calculating the torque command value by using the estimated rotational speed.

7. The method for controlling rotational speed of an air compressor in accordance with claim 6, wherein
   calculating the torque command value includes:
      performing filtering on the measured value of the rotational speed acquired in the acquiring the measured value of the rotational speed, and
      calculating the torque command value by using the current rotational speed estimated based on rotational speed as a result of the filtering and the history of the calculated torque command value.

8. The method for controlling rotational speed of an air compressor in accordance with claim 6, wherein
   the fuel cell system includes:
      a first computer that calculates the torque command value; and
      a second computer that controls rotational speed of the air compressor based on the torque command value, and
   the second computer transmits the rotational speed acquired in the acquiring the measured value of the rotational speed to the first computer.

9. The method for controlling rotational speed of an air compressor in accordance with claim 6, wherein
   the controlling the rotational speed of the air compressor includes performing smoothing processing on the calculated torque command value to generate an actual torque command, value, and controlling the rotational speed by using the actual torque command value, and
   the calculating the rotational speed command value of the air compressor includes estimating the actual torque command value corresponding to each value in the history of the calculated torque command value, and estimating the current rotational speed based on each the estimated actual torque command value and the measured value of the rotational speed.

10. The method for controlling rotational speed of an air compressor in accordance with claim 6, wherein the history of the calculated torque command value includes a plurality of newest torque command values obtained by the calculating.

\* \* \* \* \*